United States Patent [19]

Hirose et al.

[11] 3,913,819

[45] Oct. 21, 1975

[54] APPARATUS FOR TACK WELDING OF FLANGE

[75] Inventors: Kiyoshi Hirose; Kaoru Shiozawa, both of Ichihara; Yuzi Saito, Yokosuka, all of Japan

[73] Assignee: Mitsui Shipbuilding and Engineering Co., Ltd., Tokyo, Japan

[22] Filed: May 24, 1973

[21] Appl. No.: 363,498

[30] Foreign Application Priority Data

June 2, 1972 Japan................................ 47-54995

[52] U.S. Cl. ...................... 228/4.1; 228/6; 228/47; 228/48; 228/49; 219/125 R; 219/159
[51] Int. Cl... B23k 37/02; B21d 19/00; B23k 37/04
[58] Field of Search .......... 228/4, 6, 45, 47, 48, 49; 219/125 R, 159; 269/270

[56] References Cited
UNITED STATES PATENTS

| 1,804,003 | 8/1930 | Fantz .................................. 269/270 |
| 2,517,853 | 8/1950 | Eickmeyer et al. ................... 228/48 |
| 2,753,826 | 7/1956 | Dougherty ........................ 228/48 X |
| 3,255,336 | 6/1966 | Purcell ........................... 219/159 X |
| 3,634,648 | 1/1972 | Morris et al. .................... 219/125 R |

Primary Examiner—Francis S. Husar
Assistant Examiner—Gus T. Hampilos
Attorney, Agent, or Firm—Howson and Howson

[57] ABSTRACT

An apparatus for tack welding of flange to an end of a pipe comprising means for supporting the pipe at the end thereof and abutting on the side of the flange engaged with the pipe, and welding torches provided in said means, the welding torches being directed to the corner of the flange and the pipe.

1 Claim, 3 Drawing Figures

APPARATUS FOR TACK WELDING OF FLANGE

The present invention relates to an apparatus for tack welding of flange to an end of a pipe.

Related subject matter is disclosed in our co-pending applications Ser. Nos. 363,500, 363,528, and 363,499 all filed May 24, 1973.

An object of the present invention is to provide a flange tack welding apparatus which is of comparatively simplified construction and which can reliably weld the flange to the pipe.

Figure 3:
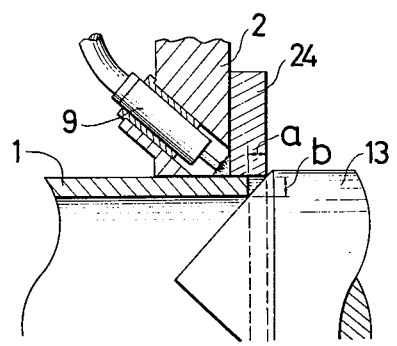
FIG. 3 is an enlarged fragmentary sectional view showing flange engaging condition.

Referring to the drawings, a pair of radial three jaws 2, 2a and 2a are provided at opposite sides of the flange welding machine to grip the pipe 1. Each jaw engages a feeding screw 4 of a respectively step motor 3 so as to be radially moved. On the outer side of each lower jaw 2a provided are two pins 5 on which a flange may be supported. Between the jaws, a supporting member 8 is provided to be radially moved by a feeding screw 7 connected to a step motor 6. A pin 10 engageable with a bolt hole of the flange is provided on the supporting member 8 and urged outwardly by the spring 11. The rear end of the pin 10 is connected to the limit switch 12 for actuation of the switch. In the end portion of each jaw, a welding torch 9 is provided to expose from an edge as shown in FIG. 3. The pipe gripping means of right side is provided on the stationary member of the machine body, but left side means is provided on an axially movable member B. A pair of centers 13 having a vertical angle of 90° and coaxial with the pipe 1 are provided and each center is adapted to be axially moved in the cylinder 16 by the piston rod 14a of the air cylinder 14. Right side air cylinder (not shown) is stationary, but the left side air cylinder 14 is provided on the movable member B, that is the air cylinder 14 is axially moved. Since hereinafter described means of opposite sides have same construction, the right half means is omitted in the drawing. The air cylinder 14 is slidably engaged with the cylinder 16 slidably provided on the member B. An electro magnet 15 is provided on the end of the cylinder 16 and slidably engaged with the center 13. The cylinder 16 has a chamber enclosed by end plates 17 and 18 and the chamber is divided into two chambers by the disk 20 secured to the air cylinder 14. The gear 21 provided on the cylinder 16 is engaged with the pinion 23 coupled to the step motor 22. Therefore, when the step motor 22 is drived, the pinion 23 rotates the gear 21 and hence the cylinder 16 and the center 13.

In operation, the movable member B is located to a position according to length of the pipe to be welded, where left side jaws are located in the left end portion of the pipe.

All jaws 2 and 2a are located at retired positions at the first, and lower jaws 2a are advanced by step motors according to pulses corresponding to the diameter of the flange to be welded to a position where pins 5 may hold the flange. The upper jaw 2 is located to a position where the side face of the jaw will be contacted to the side face of the flange. The member 8 is advanced by the step motor 6 to a position where the pin 10 may be inserted into a bolt hole of the flange.

Figure 1:
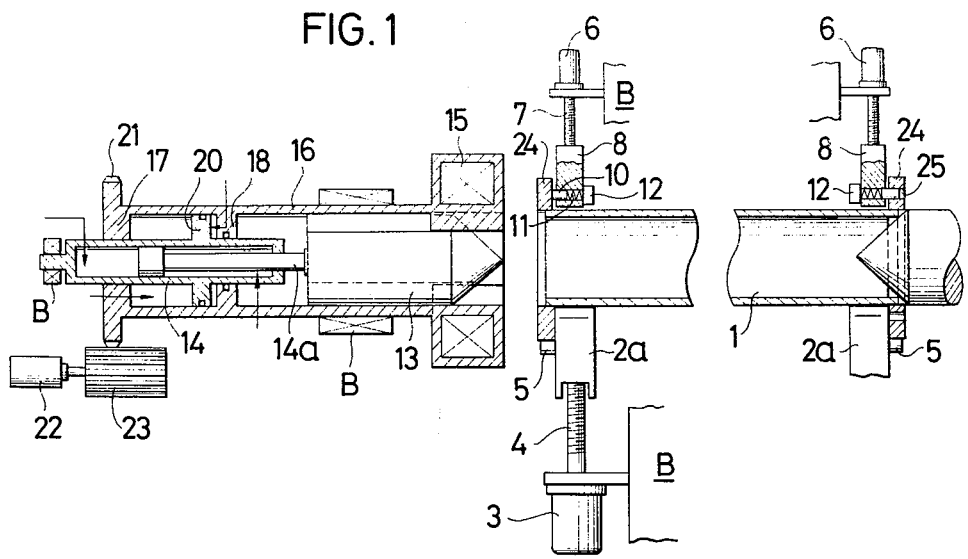
FIG. 1 is a sectional side view of the flange engaging apparatus in accordance with the present invention.
Figure 2:
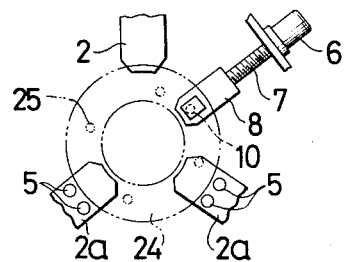
FIG. 2 is a front view of gripping jaws portion.

Thereafter, a flange 24 is fallen on pins 5 along jaws and supported on the pins where center of the flange is in slightly lower position than the axis of the pipe. Then, the center 13 is advanced by the rightward movement of the piston rod 14a of the air cylinder 14, so that the center is inserted into the center hole of the flange as shown in right half of FIG. 1 to press the flange to the side face of jaws 2a. Thus the flange is accurately aligned with the axis of a pipe to be welded. Thereafter, the cylinder 16 is rotated by the step motor 22 and hence the center 13 and the flange 24 are also rotated. When one of bolt holes 25 of the flange coincides with the pin 10, the pin is inserted into the bolt hole by the spring 11 so that the limit switch 12 is actuated by the pin to emanate an electrical signal, whereby the step motor 22 is stopped. Thus, both flanges of the opposite ends of the pipe 1 are located in the positions determined by the pins 10. Subsquently, the cylinder 16 is advanced by introducing air into the right side chamber of the cylinder, thereby the electro magnet 15 abuts on the flange to attract it, after which the electro magnet is returned with attracted flange. Then, the member 8 is retired and lower jaws 2a are moved to a proper position for supporting a pipe to be welded. In the right side means, similar operation to the above manner is performed. Then the pipe 1 is fallen on the jaws 2a and the upper jaw 2 of opposite sides is lowered to grip the pipe. Thereafter, the centers 13 and the electro magnets 15 of opposite sides are advanced to engage with the ends of the pipes and with the central hole of the flanges on the end of the pipe. By the insertion of the centers, the pipe is moved to the proper position on jaws and the flanges are removed from the magnets and located in the desired positions on the pipe by the conical surfaces of the centers as shown in FIG. 3. Since the vertical angle of the center is 90 degree, length $a$ is equal to $b$. The flange is welded to the pipe by not shown welding machine. When all jaws are opened, the pipe with flange is falled and introduced to a next working step.

What is claimed is:

1. Apparatus for tack welding a flange to a pipe, comprising a plurality of radially-adjustable jaw means for clamping a pipe at a plurality of locations about its periphery to support said pipe, at least one of said jaw means having a side positioned adjacent one end of said clamped pipe, radially-adjustable flange supporting means positioned adjacent said end of said pipe for receiving a flange dropped thereon, means reciprocable along the axis of said pipe for picking up said received flange and delivering it into abutment with said side of said at least one of said pipe-supporting jaws in the desired position for welding of said flange to said pipe, and a plurality of welding torches provided on a plurality of said jaws, said welding torches being directed at the corner formed by said pipe and said flange when said jaws are in their pipe-clamping position and said flange is in said desired position for welding.

* * * * *